United States Patent [19]
Blinkilde

[11] 3,845,261
[45] Oct. 29, 1974

[54] OCCUPANT SENSOR SEAT SWITCH WITH DEFORMABLE CONDUCTIVE SPACER PADS

[75] Inventor: Paul J. Blinkilde, Lathrup Village, Mich.

[73] Assignee: Essex International Inc., Fort Wayne, Ind.

[22] Filed: May 24, 1973

[21] Appl. No.: 363,402

[52] U.S. Cl. ............................... 200/85 A, 200/86 R
[51] Int. Cl. .................................................. H01h 3/02
[58] Field of Search ............ 200/61.55, 61.44, 85 R, 200/85 A, 86 R, 86.5, 159 R, 159 A, 159 B, 166 C, 262, 264, 265; 338/99, 100, 114, 153, 108, 198, 199

[56] References Cited
UNITED STATES PATENTS

| | | | |
|---|---|---|---|
| 2,061,222 | 11/1936 | Creson | 200/61.55 |
| 2,639,344 | 5/1953 | Rickmeyer | 200/86 R |
| 3,086,093 | 4/1963 | Barker | 200/85 R |
| 3,125,739 | 3/1964 | Deibel et al. | 200/86.5 X |
| 3,386,067 | 5/1968 | Costanzo | 338/114 X |
| 3,509,296 | 4/1970 | Harshman et al. | 200/159 R |
| 3,648,002 | 3/1972 | DuRocher | 200/265 |
| 3,704,352 | 11/1972 | Fontaine | 200/85 A UX |

Primary Examiner—James R. Scott
Attorney, Agent, or Firm—Robert D. Sommer

[57] ABSTRACT

An occupant sensor seat switch for detecting the presence of an occupant in an automobile seat. One or more resilient elastomeric pads having electrically conductive particles dispersed throughout are disposed between a base and a cover member to comprise a switch assembly. The resilient elastomeric pads are electrically conductive when compressed and nonconductive when in an uncompressed condition. Electrical connections are made to both sides of each pad so that when the pads are compressed the occupant sensor seat switch is rendered conductive.

4 Claims, 4 Drawing Figures

OCCUPANT SENSOR SEAT SWITCH WITH DEFORMABLE CONDUCTIVE SPACER PADS

BACKGROUND OF THE INVENTION

This invention relates to pressure sensitive switches and, in particular, to switches used in automobile seats to detect the presence of an occupant.

With the advent of certain Federal requirements for safety systems in automobiles, it has been necessary to provide automobile seats with switches to detect the presence of an occupant. The requirements for models prior to 1974 dictate the need for a driver and a passenger seat switch. However, an additional switch is required on 1974 models to detect the presence of a third person in the front seat. Seat switches presently used do not function properly in the center fron seat because they are influenced by the weight of the driver and/or the right front passenger.

SUMMARY OF THE INVENTION

Briefly, an occupant sensor seat switch is provided which is adapted to sit in a pocket in the top of the seat foam and just below the seat covering of a conventional automobile seat to detect the presence of an occupant in that seat. The switch assembly comprises a rigid cover and base between which one or more resilient elastomeric pads are disposed. The pads have electrically conductive particles dispersed throughout and are conductive only when compressed. If a plurality of pads are used the pads are connected in series and are located as far apart as possible around the periphery of the switch assembly. As a result a circuit can be completed only when all the resilient pads are compressed. Thus, if this switch is used in the center front seat only the weight of an occupant directly over the switch can complete a circuit. If no occupant is present in the center front seat, the driver and/or right front passenger do not affect the operation of the switch.

Accordingly, it is an object of this invention to provide a pressure sensitive seat switch for use in automobiles and other vehicles which detects the presence of an occupant in a particular seat position and which is unaffected by occupants in other seat positions.

BRIEF DESCRIPTION OF THE DRAWINGS

Reference will be made to the drawings in which.

Figure 1:
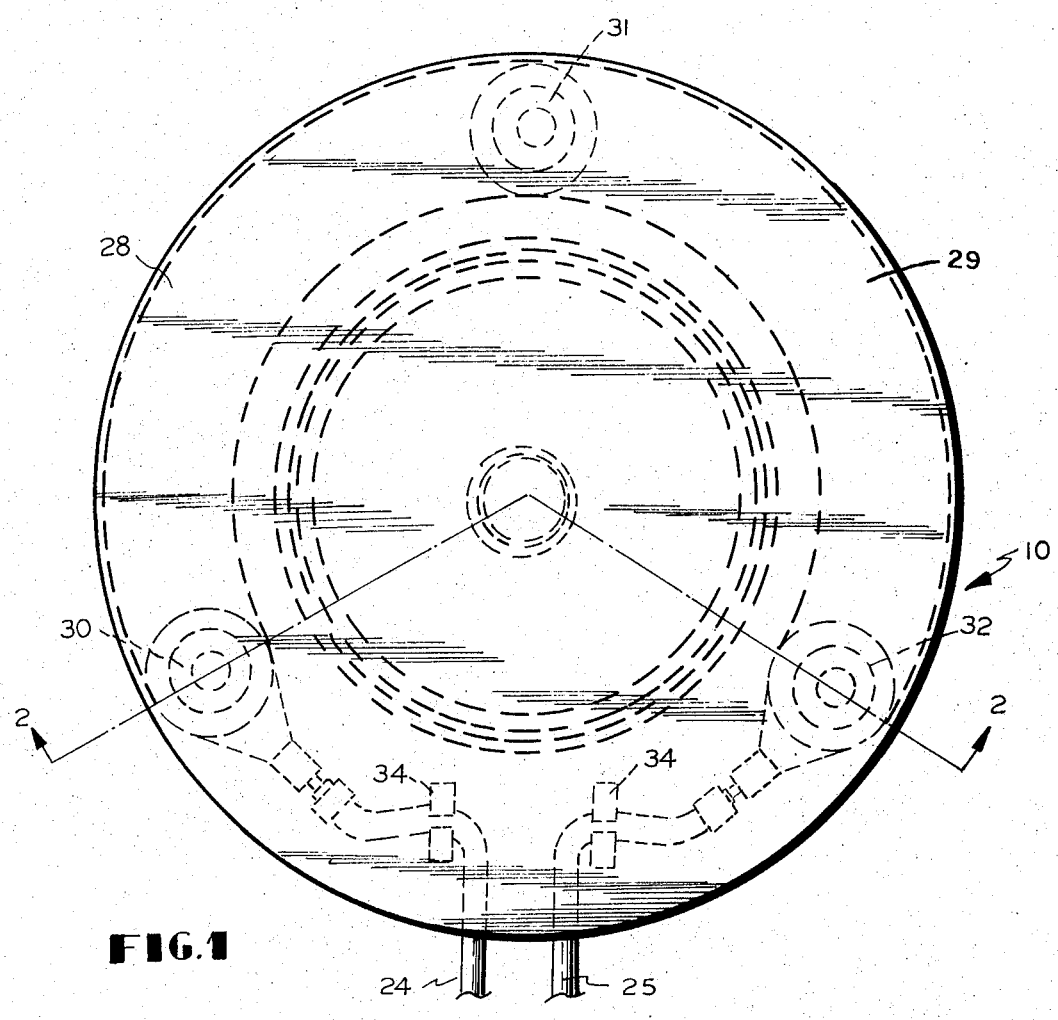
FIG. 1 is a plan view of a switch constructed according to the teachings of this invention.
Figure 2:
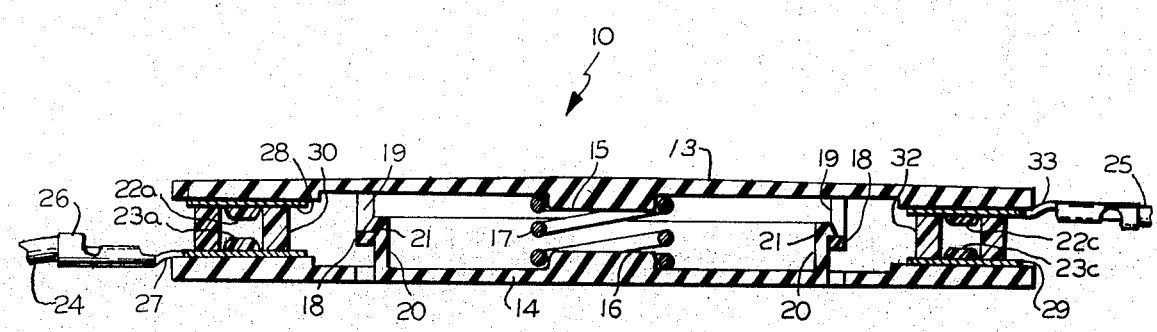
FIG. 2 is a sectional view taken along lines 2—2 of FIG. 1 with the terminals rotated to afford a better view.

The number of particles which move into particle-to-particle engagement may vary according to the force applied to the pad or to the compressive force under which it is formed, and it is not essential that all of the particles engage one another. It is only necessary that a train of particles be in engagement between the other current conductors of a circuit so as to establish a conductive path through the body. In fact, it is preferred that not all of the particles in the body engage one another. In such a case, one train of engaged particles may be consumed by an overload current, thereby rendering the body nonconductive. Other particles, however, will be unaffected thereby making it possible for such other particles to form additional trains for current conduction.

An advantage of devices of the kind herein disclosed is the ease with which they may be varied to conform to differing operating requirements. In general, the compressive force required to render a composite body conductive will be directly proportional to the thickness of the pad. A given sample of the composite body or pad, therefore, can be made responsive to extremely light pressures or responsive to relatively heavy pressures, depending on the thickness of the pad. The sensitivity of the device also is related to the quantity and size of the conductive particles. The force required to render a pad conductive varies, in general, inversely according to the quantity of particles contained within the pad and varies directly according to the size of such particles. It is possible, therefore, to manufacture devices having greatly differing operating characteristics.

The force required to render a composite body conductive and the amount of travel necessary to effect compression of the pad to a state of conductivity also is related to the density of the body. Thus, a relatively dense body requires the application of a greater compressive force than does a less dense or foamed body, whereas the foamed body requires a greater compressive movement than does the more dense body. Consequently, the force and stroke of an operating mechanism can vary within wide limits.

The material from which the device is made should be resilient at both low and high temperatures, readily moldable, stable at high temperatures, porous or nonporous, resistant to ozone, oil and arcing, inorganic, semi-inorganic durable, low in carbon content, and have high dielectric strength. Certain kinds of polyurethanes and silicone rubbers possess all of these properties. Silicone rubbers are prepared by milling together a dimethyl silicone polymer, an inorganic filler, and a vulcanizer or catalyst. Many different fillers may be used, such as titania, zinc oxide, iron oxide, silica and the like. The type and amount of filler used alters the chemical, physical and electrical properties. It is possible, therefore, to produce many different kinds of silicone rubbers which have the properties referred to above.

Many varieties of silicone rubbers exist which perform satisfactorily. For example, good results have been obtained with silicone rubbers formed by combining resins 850 or 3120 (Dow Corning Corp., Midland, Michigan) with manufacturer's recommended S, F or H cataylst or vulcanizer which includes as its active ingredients such compounds as dibutyl in dilorate or stanis octoate. Satisfactory results also have been obtained with silicone rubbers formed by combining RTV-7 resin (General Electric Co., Schenectady, New YOrk) with the manufacturer's Nuocure 28 vulcanizer. Metallic particles are stirred into the resin-catalyst substances in sufficient quantity to be dispersed substantially uniformly throughout the mass. The mixture then is poured into a mold and cured in the manner prescribed for the particular resin. Polyurethane devices are made in the same way, but utilizing the appropriate resins and catalysts. The mold may be any desired shape to produce a composite solid or foamed body composed of the elastomeric material and the metal particles, the latter being dispersed throughout the body, including its outer surfaces.

The metal particles should be formed of a metal that has excellent conductive properties and also should be one which, if it ozidizes, has an electrically conductive oxide. Particles made from noble metals such as silver and gold have the desired inherent conductivity and normally form conductive oxides, but particles composed entirely of noble metal are quite expensive. It is preferred, therefore, to use discrete, spherical metal particles composed of base metals such as copper, iron and the like, coated with silver and which act very much like solid silver particles, but which are less expensive. The size of the particles may vary from 0.05 mil to 100 mils. Excellent results have been obtained utilizing particles in the 3–8 mils range. The size of the particles should vary according to the thickness of the body or pad, the amount of force desired to be exerted on the body, and the value of the current desired to be passed through the body. In general, the current which can be accommodated by a body is directly proportional to the size of the metal particles.

A typical molded body may be formed of silicone resin and catalyst in the ratio of 10 to 1 by weight and its conductive portion or portions formed of the same resin and catalyst, in the same weight ratio, but having a particle to silicone ratio of 6 to 1. The overall body may be of any desired area and of any desired thickness, such as 0.060 inch. It should be apparent, however, that the ratios and dimensions recited may be varied within rather wide limits depending on the particular characteristics the resulting body are to possess. When a sample of a typical body is viewed under a microscope, the silicone rubber appears to encapsulate each metallic particle and isolate it from the others, but the rubber does not prevent relative movement of the particles. When the body is subjected to compressive forces and deformed or compressed, the metallic particles are forced to move relatively to one another and to the encapsulating rubber in such manner that a sufficient number of the particles move into engagement with one another to establish a conductive train or path through the body portion. Current then may flow through the conductive body portion. The low shear resistance of silicone rubber and the nonadherence of the rubber to the particles facilitate the movement of the particles. The resistance of the conductive body portion, when conductive, corresponds substantially to the resistance of the metal particles. Since the electrical resistance of noble metals, such as silver, is quite low, the resistance of the conductive portion also is quite low and, therefore, permits the latter to accommodate a high value current. For example, a conductive pad constructed of Dow Corning 3120 silicone rubber and containing 3 mil, silver coated copper particles in the ratio referred to above and having a thickness of 0.06 inch was sandwiched between conventional terminals and was capable of conducting a current of 50 amperes without impairment. Another similar pad was incorporated in a 115-volt AC circuit including a 25 watt electric lamp bulb and was cycled at the rate of 130 cycles per minute. After more than 7 million cycles of operation, the pad still functioned perfectly.

It is believed that when a conductive path is established through the conductive body portion, the current density of such path between the other circuit components is much less than that of the point-to-point contact of conventional metal-to-metal connectors. The resistance of the body portion, when conductive, has been measured to be 0.0025 ohms which is equivalent to the resistance of 4.7 inches of 8 gauge wire or 3 inches of 20 gauge wire.

When the compressive force applied to the conductive body portion is released, the inherent resilience of the silicone rubber causes the latter to expand and assume its normal, unstressed condition, whereupon the engaged conductive particles are forced to move out of engagement, thereby dis-establishing or breaking the conductive path. If there should be any arcing between particles as they separate from one another, the arcing will be confined to the interior of the body. Even though the presence of an arc may destroy or impair the current conductive capacity of the particles between which the arc forms, there are so many particles in the body, and consequently so many possible current conductive paths, that a potential path always exists through the body throughout its life expectancy. The presence of arcs within the body leaves a track, but because of the low carbon content of the silicone rubber the arcing track is composed of nonconductive inorganic matter rather than a conductive carbon track such as would be left in organic materials.

Figure 4:
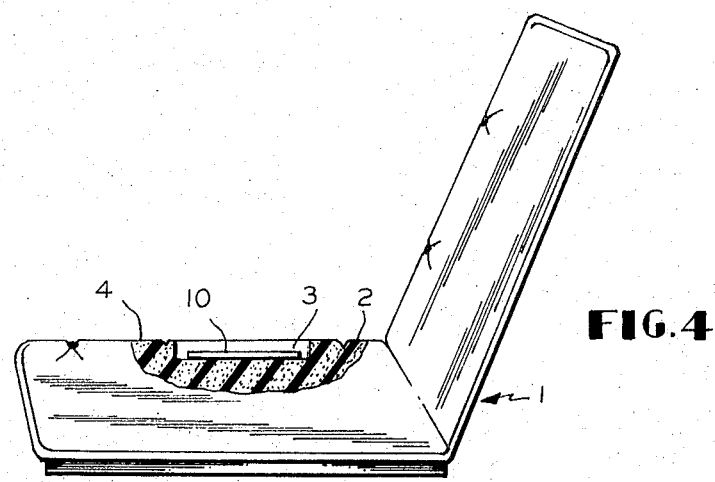
FIG. 4 is a partially broken away view of an automobile seat incorporating a switch constructed according to this invention. DESCRIPTION OF THE PREFERRED EMBODIMENT An occupant sensor seat switch constructed according to this invention comprises essentially a cover member and a base member between which one or more resilient elastomeric pads are located. The pads are formed of a synthetic, inorganic or semiorganic, resilient, nonconductive substance such as silicone rubber or polyurethane throughout which is dispersed a quantity of discrete electrically conductive particles. The dispersion of the particles is such that when the pad is in its normal, unstressed condition the electrical resistance of the pad is infinite and the pad is nonconductive. When the pad is subjected to a compressive force of sufficient magnitude, however, the particles are forced to move relatively to one another into particle-to-particle engagement. The resistance of the pad thereupon changes to that of the metal particles and the pad becomes electrically conductive. Upon release of the compressive force, the inherent resilience of the pad restores it to its normal unstressed condition whereupon the particles again move relatively to one another, but in this instance in such manner as to disengage one another and render the pad nonconductive. The change from conductive to nonconductive condition, and vice versa, occurs rapidly as in the case with a conventional switch of the snap-action type.
Figure 3:
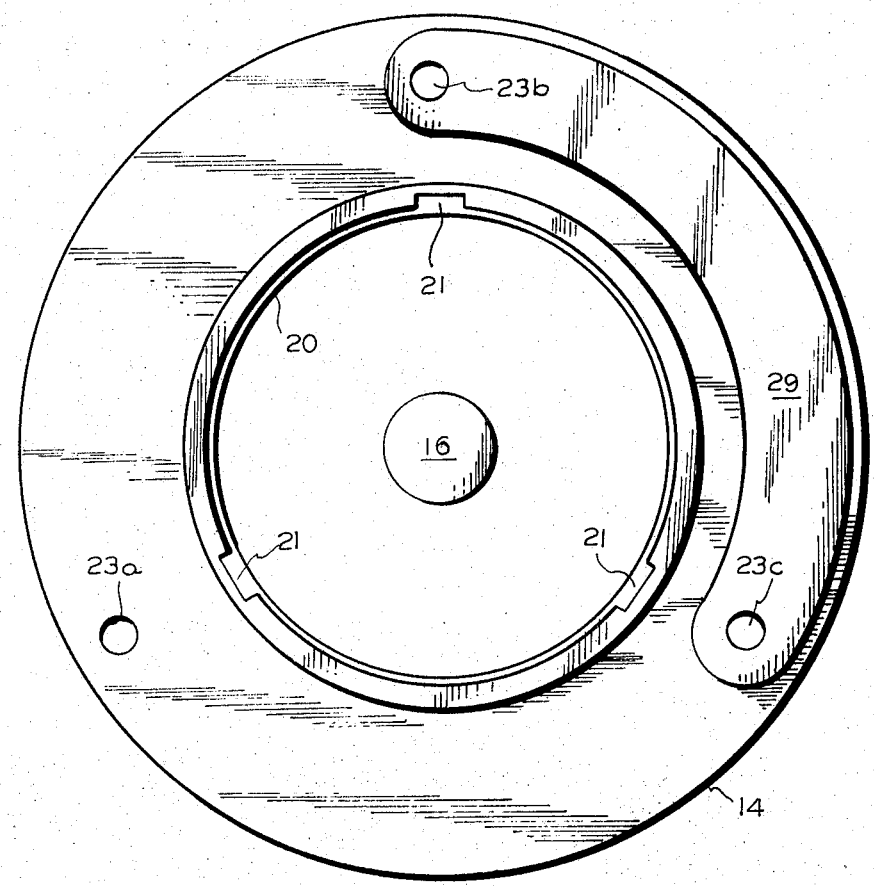
FIG. 3 is a view of the base of a switch assembly with a bus strip in place and all other parts removed.

An occupant sensor seat switch, generally indicated by reference numeral 10, is adapted to be used in conjunction with a conventional automobile seat 1 as shown in FIG. 4. The switch 10 sits in a pocket 3 in the foam padding 2 just below the seat covering 4 and is sensitive to the weight of an occupant sitting in the seat directly above the switch. The switch is normally open and can be connected to such warning devices as a buzzer or a warning light, or can prevent the engine from being started until the occupant has fulfilled certain requirements, such as fastening a seat belt.

The switch 10 is comprised of a rigid or semirigid housing made up of cover 13 and base 14. It is necessary that both the cover 13 and base 14 be made of electrically insulating material. Celcon which is an acetal resin has been found to be a suitable material. Both the cover 13 and the base 14 have a centrally located boss 15 and 16 respectively. Bosses 15 and 16 keep a compression spring 17 in place. An annular flange 18 on the cover 13 is concentric with boss 15 and has openings 19. The base 14 has an upwardly extending annular flange 20 with integral teeth 21 which engage openings 19 when the cover 13 and base 14 are brought together. The spring 17 urges the cover 13 and base 14 apart but due to the locking action of teeth 21 with openings 19 the assembly is held together. The openings 19 are large enough so that the cover 13 and base 14 may move toward one another when pressure is applied to the switch. When the pressure is removed, the spring 17 again urges the cover 13 and base 14 apart but the locking action of the teeth 21 with the openings 19 prevent separation. Three bosses 22a, 22b, and 22c smaller than the central boss 15 are located around the periphery of the cover 13. Similar bosses 23a, 23b and 23c are located on the base 14. These bosses are located so that when the cover 13 and the base 14 are locked together bosses 22a and 23a, 22b and 23b, and 22c and 23c are opposite one another. Connections are made to an electrical circuit by wires 24 and 25. A conventional serrated press on type terminal has a wire crimping portion 26 and a contact portion 27. The terminal is pressed onto boss 23a and held in place by the serrations. A bus strip 28 having serrations similar to that of terminal 27 is pressed onto bosses 22a and 22b. Another bus strip 29 exactly like bus strip 28 is pressed onto bosses 23b and 23c. Three hollow, cylindrical, resilient pads 30, 31 and 32 having electrically conductive particles dispersed throughout as previously described are located between the cover 13 and base 14, such that pad 30 sits on bosses 22a and 23a, pad 31 sits on bosses 22b and 23b, and pad 32 sits on bosses 22c and 23c. A second terminal 33 exactly like terminal 27 is pressed onto boss 23c and is crimped to wire 25. Wires 24 and 25 are held in place by clips 34.

When the switch is located in an automobile seat and an occupant sits in that seat, the cover 13 and base 14 will move toward one another. This compresses the three resilient pads 30, 31 and 32 rendering them conductive. A circuit will be completed through wire 24, terminal 27, resilient pad 30, bus strip 28, resilient pad 31, bus strip 29, resilient pad 32, terminal 33 to wire 25. When the occupant vacates the seat the compression spring 17 urges the cover 13 and base 14 apart and the resilience of the pads 30, 31, and 32 returns them to their normal uncompressed condition, opening the switch.

If this switch is used in the center of the front seat and an occupant is not present in that seat, the presence of a driver and/or right front passenger might compress only one or two resilient pads. Since the three pads are elctrically connected in series, the switch will not be closed.

It is not necessary that three resilient pads be employed. For example, in bucket seats a switch with only one resilient pad will function properly.

Thus it can be seen that numerous modifications and changes can be made in the embodiment illustrated herein without departing from the true spirit of the invention as defined in the claims.

What is claimed is:

1. A pressure sensitive switch, comprising:

rigid, electrically nonconductive cover and base members;

spring means for urging said cover and base members apart;

locking means for locking said cover and base members together, said locking means allowing said cover and base members to move toward and away from one another but preventing separation thereof;

a first pair of opposed, integral bosses on said cover and base members to limit the extent of movement of said cover and base members toward one another;

a first tubular, resilient, elastomeric pad situated between said cover and base members with said first pair of integral bosses extending axially into said pad, said first pad having a plurality of electrically conductive particles dispersed throughout and being electrically nonconductive when uncompressed and electrically conductive when compressed;

first electrical conductor means carried by said base member for making electrical contact to a first side of said first pad; and second electrical conductor means carried by said cover member for making electrical contact to a second side of said first pad.

2. The switch as claimed in claim 1 wherein said spring means comprises a compression spring compressed between said cover and base members.

3. The pressure sensitive switch as claimed in claim 1 further comprising:

a second pair of opposed, integral bosses on said cover and base members;

a third pair of opposed, integral bosses on said cover and base members;

said first, second and third pair of opposed, integral bosses being spaced apart and located near the periphery of said switch;

a second, tubular, resilient, elastomeric pad situated between said cover and base members with said second pair of integral bosses extending axially into said paid, said second pad having a plurality of electrically conductive particles dispersed throughout and being electrically non conductive when uncompressed and electrically conductive when compressed;

a third, tubular, resilient, elastomeric pad situated between said cover and base members with said third pair of integral bosses extending axially into said pad, said third pad having a plurality of electrically conductive particles dispersed throughout and being electrically non conductive when uncompressed and electrically conductive when compressed; and means for electrically connecting said first, second and third pads in series, 4. The pressure sensitive switch, as claimed in claim 3, wherein said means for electrically connecting said first, second and third pads in series comprises:

a first flat electrical conductor attached to said cover member and making electrical contact to said second side of said first pad and a first side of said second pad; and a second flat electrical conductor attached to said base member and making electrical contact to the second side of said second pad and a first side of said third pad.

* * * * *